United States Patent
Olson et al.

(10) Patent No.: US 11,724,227 B2
(45) Date of Patent: Aug. 15, 2023

(54) PULSE AIR CLEANER SYSTEM AND METHODS WITH CONTROLLED SCAVENGE

(71) Applicant: Donaldson Company, Inc., Minneapolis, MN (US)

(72) Inventors: Thomas R. Olson, Prior Lake, MN (US); Robert R. Levac, Burnsville, MN (US)

(73) Assignee: Donaldson Company, Inc., Bloomington, MN (US)

( * ) Notice: Subject to any disclaimer, the term of this patent is extended or adjusted under 35 U.S.C. 154(b) by 457 days.

(21) Appl. No.: 16/771,291

(22) PCT Filed: Dec. 13, 2018

(86) PCT No.: PCT/US2018/065490
§ 371 (c)(1),
(2) Date: Jun. 10, 2020

(87) PCT Pub. No.: WO2019/118744
PCT Pub. Date: Jun. 20, 2019

(65) Prior Publication Data
US 2020/0391150 A1    Dec. 17, 2020

Related U.S. Application Data

(60) Provisional application No. 62/598,139, filed on Dec. 13, 2017.

(51) Int. Cl.
*B01D 46/00* (2022.01)
*B01D 46/24* (2006.01)
(Continued)

(52) U.S. Cl.
CPC .............. *B01D 46/71* (2022.01); *B01D 46/24* (2013.01); *B01D 46/44* (2013.01);
(Continued)

(58) Field of Classification Search
CPC ............ B01D 46/0024; B01D 46/0068; B01D 46/24; B01D 46/44; B01D 26/44;
(Continued)

(56) References Cited

U.S. PATENT DOCUMENTS 3,631,792 A * 1/1972 Bodine ................. F01N 3/2846
422/177
4,364,751 A  12/1982 Copley
(Continued)

FOREIGN PATENT DOCUMENTS

| EP | 0043417 | 1/1982 |
| WO | WO 2006045898 | 5/2006 |

OTHER PUBLICATIONS

International Search Report and Written Opinion for PCT/US2018/065490 dated May 9, 2019 (11 pages).

*Primary Examiner* — Minh Chau T Pham
(74) *Attorney, Agent, or Firm* — Mueting Raasch Group

(57) ABSTRACT

A system and method of operating an air cleaner assembly including a selective scavenging apparatus that may be configured to actuate in response to a pulse cleaning operation. The air cleaner assembly may include an air cleaner housing, filter media positioned within an interior space of the air cleaner housing, a pulse cleaning apparatus extending into the interior space, and the selective scavenging apparatus in fluid communication with an egress aperture of the air cleaner housing. The selective scavenging apparatus may be configured to move fluid and sediment out of the air cleaner housing during a scavenging time period and the pulse cleaning apparatus may be configured to direct a pulse of gas into the clean air space during a cleaning operation. The scavenging time period may start based on the beginning of the cleaning operation and may end based on the completion of the cleaning operation.

24 Claims, 6 Drawing Sheets

(51) Int. Cl.
*B01D 46/44* (2006.01)
*B01D 46/64* (2022.01)
*B01D 46/46* (2006.01)
*B01D 46/71* (2022.01)
*F02M 35/02* (2006.01)
*F02M 35/024* (2006.01)
*F02M 35/08* (2006.01)
*F02M 35/10* (2006.01)

(52) U.S. Cl.
CPC ..... *B01D 2279/60* (2013.01); *F02M 35/0201* (2013.01); *F02M 35/024* (2013.01)

(58) Field of Classification Search
CPC .. B01D 46/71; B01D 46/446; B01D 46/2411; B01D 2279/60; B01D 46/64; F02M 35/086; F02M 35/0201; F02M 35/02416; F02M 35/10144
USPC ................ 55/302, 385.3; 95/273, 280
See application file for complete search history.

(56) References Cited

U.S. PATENT DOCUMENTS

| | | | | |
|---|---|---|---|---|
| 5,683,479 | A * | 11/1997 | Gillingham | B01D 46/10 55/385.3 |
| 7,927,396 | B2 * | 4/2011 | Olson | B01D 46/4272 55/420 |
| 8,404,021 | B2 * | 3/2013 | Gillingham | B01D 46/4272 55/428 |
| 9,186,612 | B2 * | 11/2015 | Wahlquist | F02M 35/086 |
| 9,309,841 | B2 * | 4/2016 | Troxell | B01D 46/0086 |
| 9,347,570 | B2 * | 5/2016 | Shamir | B01D 29/688 |
| 11,457,787 | B2 * | 10/2022 | Ohlendorf | B01D 46/04 |
| 2011/0011042 | A1 * | 1/2011 | Gillingham | B01D 46/48 55/302 |
| 2011/0252964 | A1 | 10/2011 | Wahlquist | |
| 2013/0239802 | A1 * | 9/2013 | Troxell | B01D 46/0086 95/20 |
| 2015/0343361 | A1 | 12/2015 | Holzmann | |
| 2020/0338488 | A1 * | 10/2020 | Olson | F02M 35/086 |

* cited by examiner

PULSE AIR CLEANER SYSTEM AND METHODS WITH CONTROLLED SCAVENGE

RELATED APPLICATION

The present application is a §371 U.S. National Stage of International Application No. PCT/US2018/065490, filed 13 Dec. 2018, which claims the benefit of U.S. Provisional Application Ser. No. 62/598,139, filed 13 Dec. 2017, entitled PULSE AIR CLEANER SYSTEM AND METHODS WITH CONTROLLED SCAVENGE, the disclosures of which are incorporated by reference in their entireties.

FIELD OF THE DISCLOSURE

The disclosure herein relates generally to air cleaner assemblies for use with, for example, vehicles and other equipment. Specifically, air cleaner assemblies that include pulse jet cleaning arrangements for cleaning air filter media and selective scavenging apparatus for removing debris cleaned from the air filter.

SUMMARY

Air cleaner assemblies for vehicles and related methods are described herein. In one or more embodiments, the air cleaner assemblies include a selective scavenging apparatus that is actuated based on a beginning and an ending of a pulse jet cleaning operation. The selective scavenging apparatus draws dust and debris, for example, which has been pulsed off the filter media of the assembly, out of the air cleaner and into the external environment. Further, the selective scavenging apparatus may be used continuously or intermittently during the pulse jet cleaning operation and the duration of the selective scavenging apparatus may be as long or longer than the pulse jet cleaning operation.

An exemplary air cleaner assembly may include an air cleaner housing, filter media, an egress aperture, a selective scavenging apparatus, and control electronics. The air cleaner housing may include an air flow inlet and an air flow outlet. The air cleaner housing may also include an outer sidewall and an interior space within the outer sidewall. The filter media may be positioned within the interior space of the air cleaner housing and may be configured to filter air passing from the air flow inlet to the air flow outlet. The filter media and the air cleaner housing may define a clean air space in fluid communication with the air flow outlet. The egress aperture may be in fluid communication with the interior space of the air cleaner housing. The selective scavenging apparatus may include a scavenging inlet and a scavenging outlet. The scavenging inlet may be in fluid communication with the egress aperture. The selective scavenging apparatus may be configured to move fluid and sediment entering the scavenging inlet, from the egress aperture, through the scavenging outlet.

The control electronics may be operably coupled to the selective scavenging apparatus and a pulse cleaning apparatus extending into the clean air space of the air cleaner housing. The control electronics may be configured to selectively actuate the pulse cleaning apparatus to perform a cleaning operation. The pulse cleaning apparatus may move fluid and sediment out of the interior space through the egress aperture during the cleaning operation. The control electronics may also be configured to selectively actuate the selective scavenging apparatus to move fluid and sediment through the scavenging outlet during a scavenging time period. The scavenging time period may start based on a beginning of the cleaning operation of the air cleaner assembly and may end based on a completion of the cleaning operation of the air cleaner assembly.

In one or more embodiments of the air cleaner assembly as described herein, the scavenging time period starts before the beginning of the cleaning operation of the air cleaner assembly, e.g., the scavenging time period starts about 10 seconds or less, 30 seconds or less, 1 minute or less, or 5 minutes or less before the beginning of the cleaning operation.

In one or more embodiments of the air cleaner assembly as described herein, the scavenging time period starts simultaneously with the beginning of the cleaning operation of the air cleaner assembly.

In one or more embodiments of the air cleaner assembly as described herein, the scavenging time period ends after the completion of the cleaning operation of the air cleaner assembly, e.g., the scavenging time period ends about 10 seconds or less, 30 seconds or less, 1 minute or less, or 5 minutes or less after the completion of the cleaning operation.

In one or more embodiments of the air cleaner assembly as described herein, the scavenging time period ends simultaneously with the completion of the cleaning operation of the air cleaner assembly.

In one or more embodiments of the air cleaner assembly as described herein, the pulse cleaning apparatus is configured to direct a single pulse of gas into the clean air space of the air cleaner housing during the cleaning operation such that sediment detaches from an exterior surface of the filter media.

In one or more embodiments of the air cleaner assembly as described herein, the pulse cleaning apparatus is configured to direct multiple pulses of gas into the clean air space of the air cleaner housing during the cleaning operation such that sediment detaches from an exterior surface of the filter media, wherein a duration of the cleaning operation is less than or equal to 60 minutes.

In one or more embodiments of the air cleaner assembly as described herein, the multiple pulses of gas are evenly spaced apart over the duration of the cleaning operation.

In one or more embodiments of the air cleaner assembly as described herein, the selective scavenging apparatus comprises an ejector comprising a pressure port between the scavenging inlet and the scavenging outlet, wherein the pressure port is in fluid communication with an exhaust source such that fluid flow from the exhaust source to the pressure port is configured to move fluid and sediment entering the scavenging inlet, from the egress aperture, through the scavenging outlet.

In one or more embodiments of the air cleaner assembly as described herein, the selective scavenging apparatus comprises an ejector comprising a pressure port between the scavenging inlet and the scavenging outlet, wherein the pressure port is in fluid communication with an air compressor such that fluid flow from the air compressor to the pressure port is configured to move fluid and sediment entering the scavenging inlet, from the egress aperture, through the scavenging outlet.

In one or more embodiments of the air cleaner assembly as described herein, the selective scavenging apparatus comprises a fan configured to move fluid and sediment entering the scavenging inlet, from the egress aperture, through the scavenging outlet.

An exemplary method of operating an air cleaner assembly that may include an air cleaner housing including an air flow inlet, an air flow outlet, an outer sidewall defining an interior space within the outer sidewall, and filter media configured to filter air passing from the air flow inlet to the air flow outlet is also described herein. The air cleaner assembly may also include an egress aperture in fluid communication with the interior space of the air cleaner housing and selective scavenging apparatus positioned proximate the air cleaner housing. The selective scavenging apparatus may include a scavenging inlet and a scavenging outlet. The scavenging inlet may be in fluid communication with the egress aperture.

The method may include selectively delivering gas into a clean air space defined by the filter media and the air cleaner housing for a pulse cleaning period such that sediment detaches from an exterior surface of the filter media. The method may also include selectively actuating the selective scavenging apparatus for a scavenging time period. The selective scavenging apparatus may move fluid and sediment entering the scavenging inlet, from the egress aperture, through the scavenging outlet during the scavenging time period. The scavenging time period may start based on the pulse cleaning period. The method may further include ceasing actuation of the selective scavenging apparatus at an end of the scavenging time period. The scavenging time period may end based on the pulse cleaning period.

In one or more embodiments of the method as described herein, the scavenging time period starts before a start of the pulse cleaning period, e.g., the scavenging time period starts about 10 seconds or less, 30 seconds or less, 1 minute or less, or 5 minutes or less before the start of the pulse cleaning period.

In one or more embodiments of the method as described herein, the scavenging time period starts simultaneously with a start of the pulse cleaning period.

In one or more embodiments of the method as described herein, the scavenging time period ends after an end of the pulse cleaning period, e.g., the scavenging time period ends about 10 seconds or less, 30 seconds or less, 1 minute or less, or 5 minutes or less after the end of the pulse cleaning period.

In one or more embodiments of the method as described herein, the scavenging time period ends simultaneously with an end of the pulse cleaning period.

In one or more embodiments of the method as described herein, selectively delivering gas into the clean air space comprises directing a single pulse of gas into the clean air space of the air cleaner housing during the pulse cleaning period such that sediment detaches from an exterior surface of the filter media.

In one or more embodiments of the method as described herein, selectively delivering gas into the clean air space comprises directing multiple pulses of gas into the clean air space of the air cleaner housing during the pulse cleaning period such that sediment detaches from an exterior surface of the filter media, wherein a duration of the cleaning operation is less than or equal to 60 minutes.

In one or more embodiments of the method as described herein, the multiple pulses of gas are evenly spaced apart over the duration of the pulse cleaning period.

In one or more embodiments of the method as described herein, the selective scavenging apparatus comprises an ejector defining a pressure port between the scavenging inlet and the scavenging outlet, wherein actuating the selective scavenging apparatus comprises directing fluid flow from an exhaust source, in fluid communication with the pressure port, through the pressure port of the ejector to move fluid and sediment entering the scavenging inlet, from the egress aperture, through the scavenging outlet.

In one or more embodiments of the method as described herein, the selective scavenging apparatus comprises an ejector defining a pressure port between the scavenging inlet and the scavenging outlet, wherein actuating the selective scavenging apparatus comprises directing fluid flow from an air compressor, in fluid communication with the pressure port, through the pressure port of the ejector to move fluid and sediment entering the scavenging inlet, from the egress aperture, through the scavenging outlet.

In one or more embodiments of the method as described herein, actuating the selective scavenging apparatus comprises opening a valve to provide fluid communication between the pressure port of the ejector and an air supply and ceasing actuation of the selective scavenging apparatus comprises closing the valve to prevent fluid communication between the pressure port of the ejector and the air supply.

In one or more embodiments of the method as described herein, the selective scavenging apparatus comprises a fan configured to move fluid and sediment entering the scavenging inlet, from the egress aperture, through the scavenging outlet.

Another exemplary air cleaner assembly may include an air cleaner housing, filter media, an egress aperture, a pulse cleaning apparatus, a selective scavenging apparatus, and control electronics. The air cleaner housing may include an air flow inlet and an air flow outlet. The air cleaner housing may also include an outer sidewall defining an interior space within the outer sidewall. The filter media may be positioned within the interior space of the air cleaner housing and configured to filter air passing from the air flow inlet to the air flow outlet. The filter media and the air cleaner housing may define a clean air space in fluid communication with the air flow outlet. The egress aperture may be in fluid communication with the interior space of the air cleaner housing. The pulse cleaning apparatus may extend into the clean air space in the air cleaner housing. The selective scavenging apparatus may include a scavenging inlet and a scavenging outlet. The scavenging inlet may be in fluid communication with the egress aperture. The selective scavenging apparatus may be configured to move fluid and sediment entering the scavenging inlet, from the egress aperture, through the scavenging outlet.

The control electronics may be operably coupled to the selective scavenging apparatus and the pulse cleaning apparatus. The control electronics may be configured to selectively actuate the selective scavenging apparatus for a scavenging time period. The selective scavenging apparatus may move fluid and sediment entering the scavenging inlet, from the egress aperture, through the scavenging outlet during the scavenging time period. The control electronics may also be configured to selectively direct a pulse of gas into the clean air space for a pulse cleaning period using the pulse cleaning apparatus such that sediment detaches from an exterior surface of the filter media. A duration of the scavenging time period may be greater than or equal to the pulse cleaning period.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
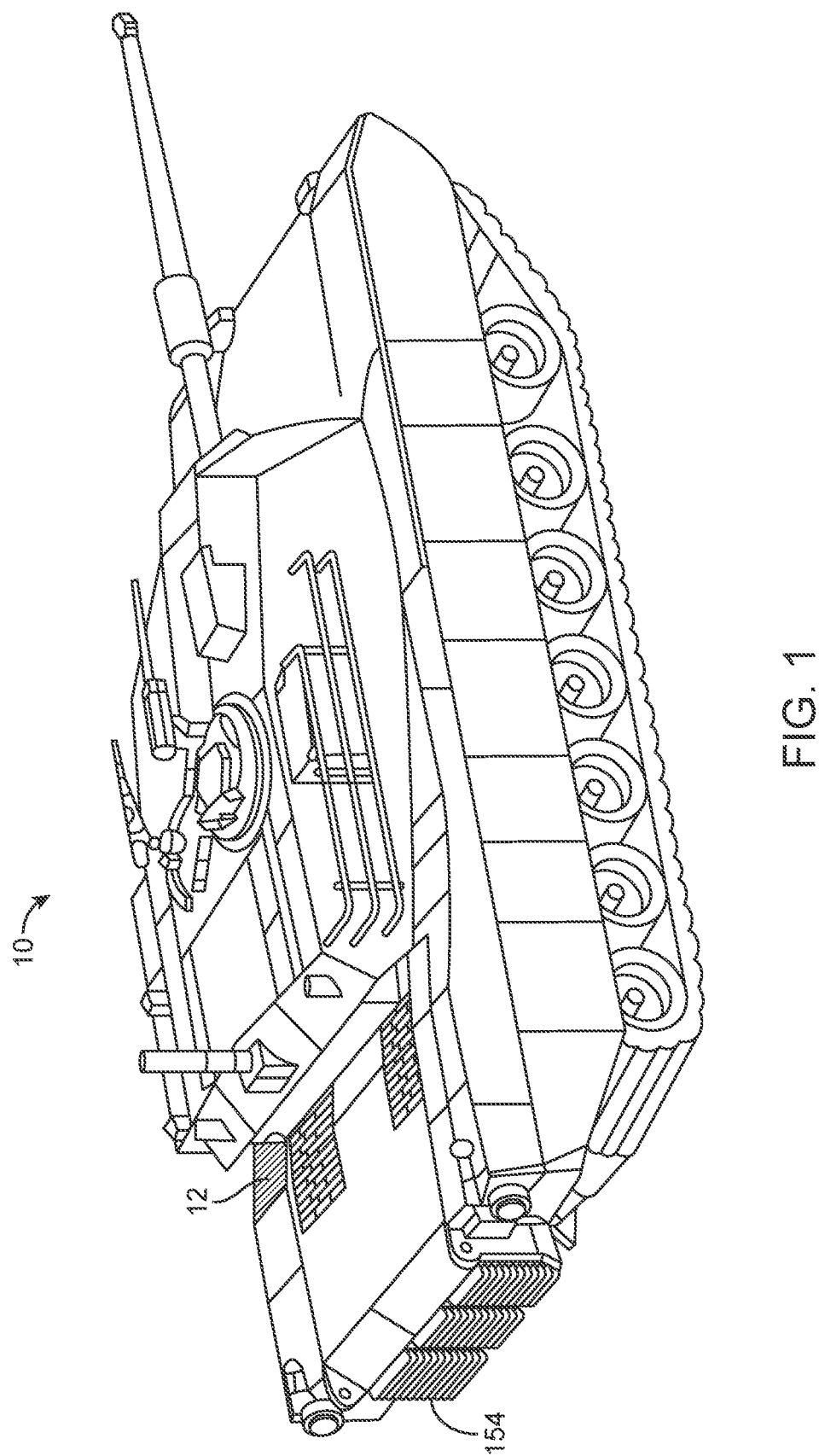
FIG. 1 is a perspective view of one illustrative embodiment of a vehicle incorporating an air cleaner assembly as described herein.

In the following description of illustrative embodiments, reference is made to the accompanying figures of the drawing, which form a part hereof, and in which are shown, by way of illustration, specific embodiments. It is to be understood that other embodiments may be utilized and structural changes may be made without departing from the scope of the present invention.

The disclosure herein includes illustrative embodiments of systems, apparatus, structures, and methods for an air cleaner assembly including a scavenging apparatus that selectively moves debris and sediment out of an air cleaner housing of a vehicle and/or equipment. Specifically, the scavenging apparatus actuates based on the timing of a cleaning operation of a pulse cleaning apparatus (e.g., a pulse jet cleaner) that may be configured to move debris and sediment off of filter media (e.g., an exterior surface of the filter media) within the air cleaner housing.

The pulse cleaning apparatus may, in one or more embodiments, carry out a pulse cleaning operation that may selectively clean a dirty filter without manual user interaction (e.g., without the user physically cleaning the filter). The pulse cleaning operation may be configured for manual or automatic activation (e.g., an operator may actuate or start the cleaning operation through wired or wireless electronics; or the cleaning operation may begin automatically based on a state or cleanliness of the filter). The pulse cleaning apparatus may, in one or more embodiments, be configured to produce a pulse of air within a clean air space to force debris and sediment from an exterior surface of the filter media in an effort to clean the filter. The pulse of air may be a high-pressure concentration of air that produces a force on the filter media such that the debris and sediment detaches from the filter media. At least some of the detached debris and sediment may remain within the air cleaner housing (but outside of the filter media) after the pulsing operation; therefore, the scavenging apparatus may be configured to facilitate removal of at least some of the detached debris and sediment out of the air cleaner housing.

Furthermore, the coordination between the scavenging apparatus and the pulse cleaning apparatus may, e.g., improve the process of cleaning the filter system, use less energy for operation of the air cleaner system, etc. For example, by selectively actuating the scavenging apparatus just prior to (e.g., within one minute, within 30 seconds, within 5 seconds) or simultaneously with (e.g., at the same time) the start of a pulse cleaning operation as well as during the duration of the pulse cleaning operation, the scavenging apparatus may be more efficiently and effectively utilized. Similarly, the scavenging apparatus may stop simultaneously with (e.g., at the same time) or just after (e.g., after 5 seconds, after 30 seconds, after one minute) the end of a pulse cleaning operation. As such, the air cleaner assembly described herein includes an actively selective scavenging apparatus that may be configured to start and/or stop based on the operation of the pulse cleaning apparatus.

In one or more embodiments, the actuating/"starting" of the scavenging apparatus may describe the scavenging apparatus as changing from a first scavenging mode (e.g., a reduced flow rate, which may be greater than or equal to a zero flow rate) to a second scavenging mode (e.g., an increased flow rate). In other words, the scavenging apparatus may be operating at a reduced flow rate and after actuating/"starting," the flow rate is increased. Similarly, "stopping" the scavenging apparatus may describe the scavenging apparatus as changing from the second scavenging mode to the first scavenging mode.

One illustrative embodiment of an air cleaner system within a vehicle 10 is depicted in FIG. 1. Specifically, FIG. 1 illustrates an M1 tank, however, the air cleaner system described herein may be applied to air filter systems of a variety of vehicles and/or equipment. For example, the air cleaner system may be implemented within armored vehicles, tracked personnel carriers, wheeled vehicles, mobile generators, stationary generators, etc.

The vehicle 10 may include an inlet 12 configured to allow the flow of air from the exterior environment, through filter media, and towards the engine intake. The inlet 12 may be located at any suitable location on the vehicle 10. Further, the vehicle 10 may include a scavenging outlet 154 configured as a passageway for detached particulate matter (e.g., debris, dust, sediment, etc.) to exit the air cleaner assembly after being pulsed from the filter media. The scavenging outlet 154 may be located at any suitable location on the vehicle 10. For example, the scavenging outlet 154 may disperse particulate matter into a general exhaust of the vehicle 10.

The process of cleaning the air filter system of the vehicle 10 by accessing and manually cleaning the filter may be complicated by many different factors. For example, the vehicle 10 may include numerous armored portions that may need to be removed or opened in order to access the pertinent components of the filter system. Further, any removal of armored portions of the vehicle or accessing the filter system may require immobilizing the vehicle 10 and, therefore, pulling the vehicle out of service for a duration of time. Further yet, the engine may be extremely hot from operation, which may create a dangerous situation in accessing the filter system or necessitate even more down time for cooling. A number of other complications may arise from the process of manually attending to the filter system.

As such, the air cleaner system, as described herein, may provide for hands-off solutions to maintaining a clean filter system. For example, the pulse cleaner apparatus may help to further automate the cleaning process to ensure an efficient and effective way to maintain a clean filter. Additionally, the scavenging apparatus may further increase the efficiency and effectiveness of the air cleaner assembly by improving removal of the particulate driven off of the filter media by the pulse cleaning apparatus.

Figure 2:
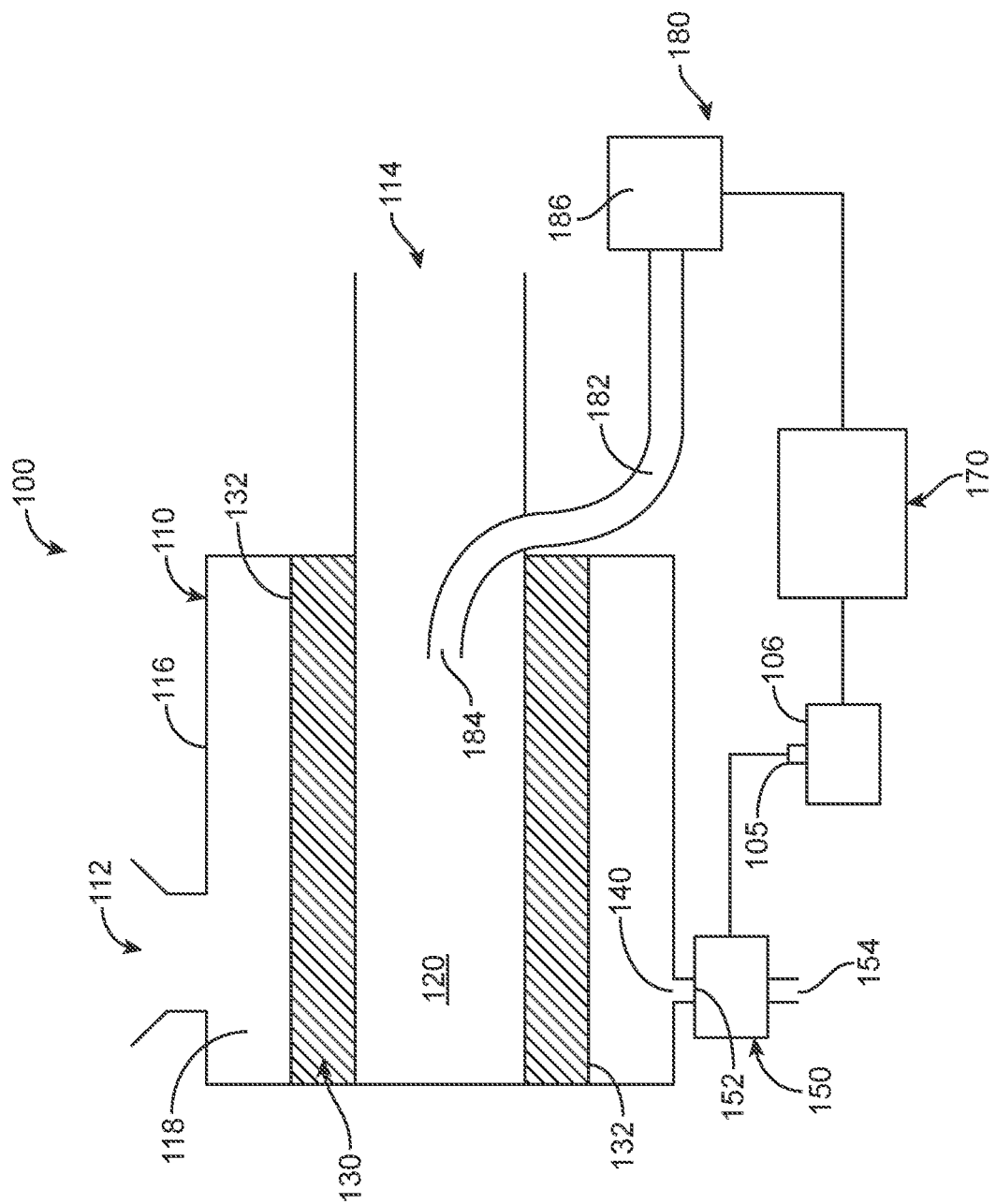
FIG. 2 is schematic view of one illustrative embodiment of an air cleaner assembly including a scavenging apparatus.

FIG. 2 illustrates one illustrative embodiment of an air cleaner assembly 100 including a scavenging apparatus 150. In one or more embodiments, the air cleaner assemblies 100 described herein may be similar to the air cleaner assemblies described in, e.g., U.S. Pat. No. 8,404,021 entitled "Air Cleaner Having Scavenger Arrangement," U.S. Pat. No. 5,683,479 entitled "Pulse Jet Air Cleaner System; Components; and, Methods," U.S. Pat. No. 7,927,396 entitled "Evacuation Value Arrangements; Pulse Jet Air Cleaner Systems Using Same; and, Method," and U.S. Pat. No. 9,186,612 entitled "Pulse Jet Air Cleaner Systems; Evacuation Valve Arrangements; Air Cleaner Components; and Methods," with the addition of the scavenging apparatus 150 for improving the cleaning process and, thus, potentially improving filter efficiency and/or life. The air cleaner assembly 100 may include an air cleaner housing 110 having an air flow inlet 112 and an air flow outlet 114. The air flow inlet 112 may extend from the inlet 12 of the vehicle 10 (e.g., as shown in FIG. 1). The air flow outlet 114 may be in fluid communication with the engine intake such that filtered air passes from the air flow outlet 114 to the engine intake. The air cleaner housing 110 may also include an outer sidewall 116 and an interior space 118 within the outer sidewall 116.

Furthermore, as shown in FIG. 2, the air cleaner assembly 100 may include filter media 130 positioned within the interior space 118 of the air cleaner housing 110. The filter media 130 may be configured to filter air passing from the air flow inlet 112 to the air flow outlet 114. In other words, the filter media 130 may be positioned such that air passing between the air flow inlet 112 and the air flow outlet 114 must travel through the filter media 130. The filter media 130 and the air cleaner housing 110 may define a clean air space 120 in fluid communication with the air flow outlet 114. The clean air space 120 may be described as within the filter media 130 and, therefore, may only contain air that has been filtered (e.g., due to air traveling from the air flow inlet 112 and through the filter media 130). As such, only filtered air may proceed through the air flow outlet 114 and towards the engine intake. The filter media 130 may define an exterior surface 132 that may be exposed to the air flow inlet 112 such that particulate entering the air flow inlet 112 may attach to the exterior surface 132 of the filter media 130 as air passes through the filter media 130.

The filter media 130 may be any suitable shape and size that forms a filter barrier between the air flow inlet 112 and the air flow outlet 114. As shown in FIG. 2, the filter media 130 represents a cross-sectional view of a cylindrical/annular filter media 130. The filter media used in one or more alternative embodiments of an air cleaner assembly described herein may define a filter media that is, e.g., axial seal cylindrical, radial seal cylindrical, POWERCORE, VEE-PAC, etc. Further, the filter media 130 may be positioned away from the air cleaner housing 110 such that there may be a gap between the filter media 130 and the air cleaner housing 110. This gap between the filter media 130 and the air cleaner housing 110 may provide a passageway for air to travel from the air flow inlet 112 and disperse over the surface area of the filter media 130 (e.g., to improve access to the filter media 130) before passing through the filter media 130 and into the clean air space 120.

The air cleaner assembly 100 may also include an egress aperture 140 (e.g., an opening) extending through the outer sidewall 116 of the air cleaner housing 110. The egress aperture 140 may provide fluid communication between the interior space 118 of the air cleaner housing 110 and the external environment. For example, any particulate that may be present within the interior space 118 (e.g., outside of the clean air space 120), which is not located on the filter media 130, may exit the interior space 118 through the egress aperture 140.

The egress aperture 140 may be located at any suitable location along the air cleaner housing 110. For example, the egress aperture 140 may be located on a bottom of the air cleaner housing 110 (e.g., as shown in FIG. 2) such that gravity may assist in helping any loose particulate move towards the egress aperture 140. Further, the outer sidewall 116 of the air cleaner housing 110 may be angled or slanted towards the egress aperture 140 so that particulate passing over the outer sidewall 116 is predisposed to move towards the egress aperture 140. For example, in one or more embodiments, the egress aperture 140 may be similar to the evacuation port described in, e.g., U.S. Pat. No. 7,927,396 entitled "Evacuation Value Arrangements; Pulse Jet Air Cleaner Systems using Same; and, Methods."

Furthermore, the air cleaner assembly 100 may include a scavenging apparatus 150 positioned relative to the air cleaner housing 110. In one or more embodiments, the scavenging apparatus 150 may be positioned outside of the interior space 118 of the air cleaner housing 110. In other embodiments, the scavenging apparatus 150 may be positioned within the air cleaner housing 110 (e.g., within the interior space 118). The scavenging apparatus 150 may include a scavenging inlet 152 and a scavenging outlet 154. The scavenging inlet 152 may be in fluid communication with the egress aperture 140 (e.g., so that fluid and/or particulate may pass between the egress aperture 140 and the scavenging inlet 152). In one or more embodiments, the egress aperture 140 and the scavenging inlet 152 may be coincident with each other. The scavenging apparatus 150 may be configured to move fluid and sediment entering the scavenging inlet 152, from the egress aperture 140, through the scavenging apparatus 150 to the scavenging outlet 154. In such embodiments in which the scavenging apparatus 150 is positioned within the air cleaner housing 110, the scavenging apparatus 150 may be positioned such that the scavenging outlet 154 is coincident with the egress aperture 140 and the fluid and sediment moves through the scavenging apparatus 150 to the egress aperture 140.

The scavenging apparatus 150 may be described as a selective scavenging apparatus because the scavenging apparatus 150 may be configured to be actuated at specific times for specific durations (e.g., based on a cleaning operation). In other words, the selective nature of the selective scavenging apparatus pertains to time (e.g., starting time, ending time, and/or duration of time) rather than to selectively choosing the direction of the scavenging.

The air cleaner assembly 100 may further include a pulse cleaning apparatus 180 extending into the clean air space 120 in the air cleaner housing 110. The pulse cleaning apparatus 180 may be configured to produce a pulse of air within the clean air space 120, which applies a force on the filter media 130 from within the clean air space 120. The pulse cleaning apparatus 180 may define any shape and may include any configuration of components. For example, the pulse cleaning apparatus 180 may include a pulse tube 182 extending through the air cleaner housing 110 and into the clean air space 120. The pulse tube 182 defines a discharge outlet 184 positioned in the clean air space 120 and facing away from the air flow outlet 114. As a result, the force from the pulse of air of the pulse cleaning apparatus 180 travels from the discharge outlet 184 to the filter media 130 to detach or separate particulate (e.g., that has accumulated on filter media 130) from the exterior surface 132 of the filter media 130. For example, in one or more embodiments, the pulse cleaning apparatus 180 may be similar to the pulse assembly described in, e.g., U.S. Pat. No. 8,404,021 entitled "Pulse jet Air Cleaner System; Components; and, Methods."

The pulse cleaning apparatus 180 may further include an accumulator tank 186 configured to receive compressed gas (e.g., air) therein, from a compressor system (e.g., air compressor 104 described further herein) of the vehicle 10 or other equipment. The pulse cleaning apparatus 180 may also include a control valve positioned between the accumulator tank 186 and the pulse tube 182 and configured to restrict the compressed air from exiting the accumulator tank 186 before desired. Further, a switch or solenoid may be used to operate or actuate the control valve to discharge the compressed gas in the accumulator tank through the pulse tube 182. The accumulator tank 186 may be configured to store pressurized air at a selected pressure value (which is then discharged into the clean air space 120 at that selected pressure) that may be suitable for a pulsing operation. For example, the accumulator tank 186 may define a pressure value of about 60 to 200 psi, 80 to 120 psi, or 100 psi. Further, the volume of the accumulator tank 186 may define any suitable interior volume. For example, the accumulator tank 186 may define an interior volume of about 130 to 500 cubic inches or at least 250 cubic inches.

Control electronics 170 may be operably coupled to each of the scavenging apparatus 150 and the pulse cleaning apparatus 180 (or to air supply sources thereof). The control electronics 170 may be configured to control the scavenging apparatus 150 and, optionally, the pulse cleaning apparatus 180. The methods and/or logic described in this disclosure, including those attributed to the air cleaner assembly 100, or various constituent components (e.g., the control electronics 170), may be implemented, at least in part, in hardware, software, firmware, or any combination thereof. For example, various aspects of the techniques may be implemented within one or more processors, including one or more microprocessors, microcontrollers, DSPs, ASICs, FPGAs, or any other equivalent integrated or discrete logic circuitry, as well as any combinations of such components, or other devices. The term "processor" or "processing circuitry" may generally refer to any of the foregoing logic circuitry, alone or in combination with other logic circuitry, or any other equivalent circuitry. Such hardware, software, and/or firmware may be implemented within the same system or within separate systems to support the various operations and functions described in this disclosure. In addition, any of the described components may be implemented together or separately as discrete but interoperable logic devices.

When implemented in software, the functionality ascribed to the systems, devices and methods described in this disclosure may be embodied as instructions and/or logic on a computer-readable medium such as RAM, ROM, NVRAM, EEPROM, FLASH memory, magnetic data storage media, optical data storage media, or the like. The instructions and/or logic may be executed by one or more processors to support one or more aspects of the functionality described in this disclosure.

The control electronics 170 may be configured to selectively actuate (e.g., control the initiation, duration, and ending) the pulse cleaning apparatus 180 to perform a cleaning operation during, e.g., a pulse cleaning period. The control electronics 170 may also be configured to selectively actuate (e.g., control the initiation, duration, and ending) the scavenging apparatus 150 to move the fluid and sediment out of the scavenging apparatus 150 through the scavenging outlet 154 during a scavenging time period. The scavenging time period may start based on a beginning of the cleaning operation of the air cleaner assembly 100 and may end based on a completion of the cleaning operation of the air cleaner assembly 100. In one or more embodiments, a duration of the scavenging time period may be greater than or equal to the pulse cleaning operation.

The cleaning operation may be conducted by causing the pulse cleaning apparatus 180 to direct a pulse of air through the discharge outlet 184 and into the clean air space 120. The cleaning operation may extend for a duration of time that may be described as a pulse cleaning period. The cleaning operation may include a single pulse of gas (discharged by the pulse cleaning apparatus 180) into the clean air space 120 (e.g., as shown in FIG. 6A) or may include multiple pulses of gas (discharged by the pulse cleaning apparatus 180) into the clean air space 120 (e.g., as shown in FIG. 6B) within a relatively short period of time, e.g., 60 minutes or less, 20 minutes or less, 10 minutes or less, 5 minutes or less, 2 minutes or less, etc.

Figure 6A:
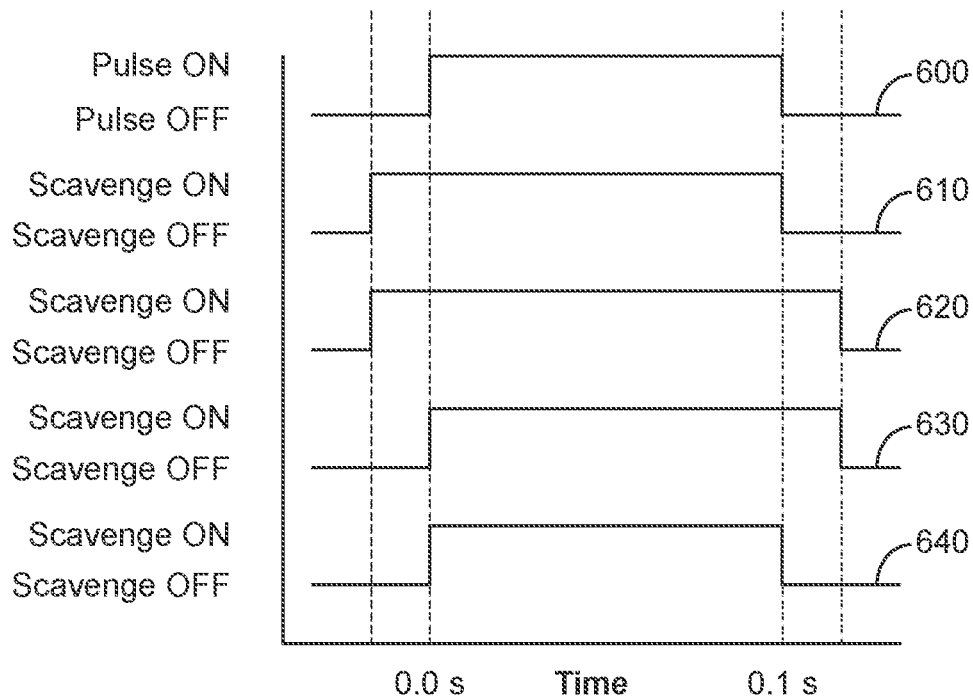
FIGS. 6A-6B are graphical representations of illustrative embodiments of relative durations of a scavenging operation compared to one or more pulse cleaning operations.
Figure 6B:
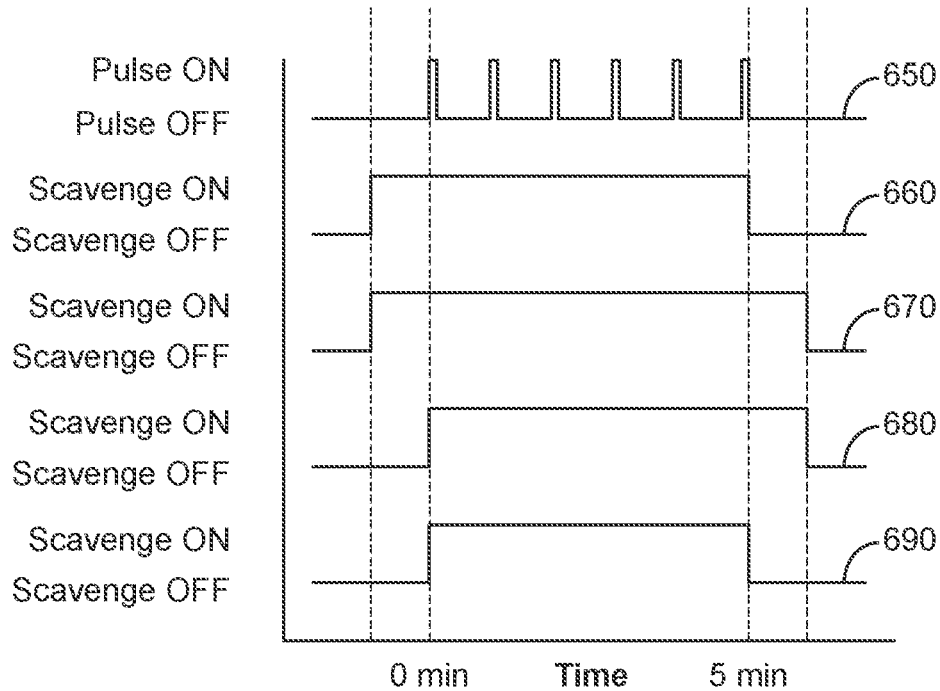

FIG. 6A illustrates one embodiment of a cleaning operation 600 that includes the pulse cleaning apparatus 180 creating one pulse for a duration of time. In other words, the duration of the cleaning operation 600 is the duration of the single pulse (e.g., the cleaning operation starting at the beginning of the pulse and the cleaning operation ending at the end of the pulse). The pulse may occur for any suitable duration of time depending on the pressure and tank size of the pulse cleaning apparatus 180. For example, a single pulse of the pulse cleaning apparatus 180 may last for about 0.1 seconds. It is noted that pulse duration of longer than about 0.1 seconds may only increase the time to refill the accumulator (e.g., to prepare for the next pulse) without increasing the performance of the pulse (e.g., the effectiveness of the pulse in cleaning the filter media 130).

Various scavenging time periods for which the scavenging apparatus actuates (e.g., turns on) to move fluid and sediment through the scavenging outlet 154 may be based on the beginning and ending of the cleaning operation 600. For example, the scavenging time period may start before or simultaneously with the beginning of the cleaning operation 600 and/or the scavenging time period may end after or simultaneously with the end of the cleaning operation 600. In other words, the scavenging time period may, in one or more embodiments, include any combination of starting before or simultaneously with the beginning of the cleaning operation 600 and ending after or simultaneously with the ending of the cleaning operation 600 (e.g., starting before and ending after, starting simultaneously with and ending after, starting before and ending simultaneously with, and starting simultaneously with and ending simultaneously with). In one or more alternative embodiments, the scavenging time period may start after the beginning of the cleaning operation 600 and/or may end before the end of the cleaning operation 600.

In the illustrative embodiments depicted in FIG. 6A, scavenging time periods 610, 620 start before the beginning of the cleaning operation 600 of the air cleaner assembly 100 and scavenging time periods 630, 640 start simultaneously with the beginning of the cleaning operation 600 of the air cleaner assembly 100. Furthermore, as shown in FIG. 6A, scavenging time periods 620, 630 end after the end of the cleaning operation 600 of the air cleaner assembly 100 and scavenging time periods 610, 640 end simultaneously with the end of the cleaning operation 600 of the air cleaner assembly 100.

FIG. 6B illustrates one illustrative embodiment of a cleaning operation 650 that includes the pulse cleaning apparatus 180 creating multiple pulses for a duration of time. In other words, the duration of the cleaning operation 650 is the duration of all of the pulses (e.g., the cleaning operation starting at the beginning of the first pulse and the cleaning operation ending at the end of the last pulse). As described herein, each pulse may occur for any suitable duration of time depending on the pressure and tank size of the pulse cleaning apparatus 180. The cleaning operation 650 may include any number pulses that are suitable for the cleaning operation 650. For example, the cleaning operation 650 may include two, three, four, five, six, etc. pulses during the duration of the cleaning operation 650. Specifically, as shown in FIG. 6B, the cleaning operation may include six pulses. The multiple pulses may be temporarily separated from each other at any suitable increment or increments. For example, the multiple pulses may occur greater than or equal to 10 seconds apart, greater than or equal to 20 seconds apart and/or less than or equal to 30 seconds apart, less than or equal to 1 minute apart, less than or equal to 2 minutes apart, etc. The duration of time between each individual pulse may be determined by the operating parameters of the pulse cleaning apparatus 180. For example, pulse cleaning apparatus 180 may need to recharge before discharging another pulse into the clean air space 120 (e.g., because the accumulator tank 186 may need to regenerate enough compressed air to provide the desired pressure). The total duration of the cleaning operation 650 including multiple pulses may be about less than or equal to 60 minutes, less than or equal to 30 minutes, less than or equal to 10 minutes, less than or equal to 5 minutes, etc. Furthermore, the multiple pulses may be evenly spaced apart over the duration of the cleaning operation 650 or the multiple pulses may have varying intervals between each pulse over the duration of the cleaning operation 650. Further yet, in some embodiments, the maintenance pulse cycle may occur, e.g., every 60 minutes of continuous vehicle operation.

Various scavenging time periods for which the scavenging apparatus actuates (e.g., turns on) to move fluid and sediment through the scavenging outlet 154 may be based on the beginning and ending of the cleaning operation 650. For example, the scavenging time period may start before or simultaneously with the beginning of the cleaning operation 650 and/or the scavenging time period may end after or simultaneously with the end of the cleaning operation 650. In other words, the scavenging time period may include any combination of starting before or simultaneously with the beginning of the cleaning operation 650 and ending after or simultaneously with the ending of the cleaning operation 650 (e.g., starting before and ending after, starting simultaneously with and ending after, starting before and ending simultaneously with, and starting simultaneously with and ending simultaneously with). In some embodiments, the scavenging time period may start after the beginning of the cleaning operation 650 and/or may end before the end of the cleaning operation 650.

As shown in FIG. 6B, in one or more embodiments, the scavenging time periods 660, 670 start before the beginning of the cleaning operation 650 (e.g., before the first pulse) of the air cleaner assembly 100 and scavenging time periods 680, 690 start simultaneously with the beginning of the cleaning operation 650 (e.g., at the beginning of the first pulse) of the air cleaner assembly 100. Furthermore, as shown in FIG. 6B, in one or more embodiments, scavenging time periods 670, 680 end after the end of the cleaning operation 650 (e.g., after the last pulse) of the air cleaner assembly 100 and scavenging time periods 660, 690 end simultaneously with the end of the cleaning operation 650 (e.g., at the end of the last pulse) of the air cleaner assembly 100.

The period of time that the scavenging time period starts before the beginning of the cleaning operation (for a single pulse or multiple pulses) or ends after the end of the cleaning operation (for a single pulse or multiple pulses) may be any suitable time. For example, the scavenging time period may start about 10 seconds or less, 30 seconds or less, 1 minute or less, or 5 minutes or less before the cleaning operation begins. In some embodiments, the scavenging apparatus 150 may require that time prior to the start of the cleaning operation to get the scavenging apparatus 150 to a suitable operating condition (e.g., a fan as described further herein). Furthermore, the scavenging time period may end about 10 seconds or less, 30 seconds or less, 1 minute or less, 5 minutes or less after the cleaning operation ends. Specifically, the scavenging time period may start or end between about 10 seconds and 30 seconds before or after, respectively, the cleaning operation depending on the various types and durations of the scavenging apparatus 150.

Figure 3:
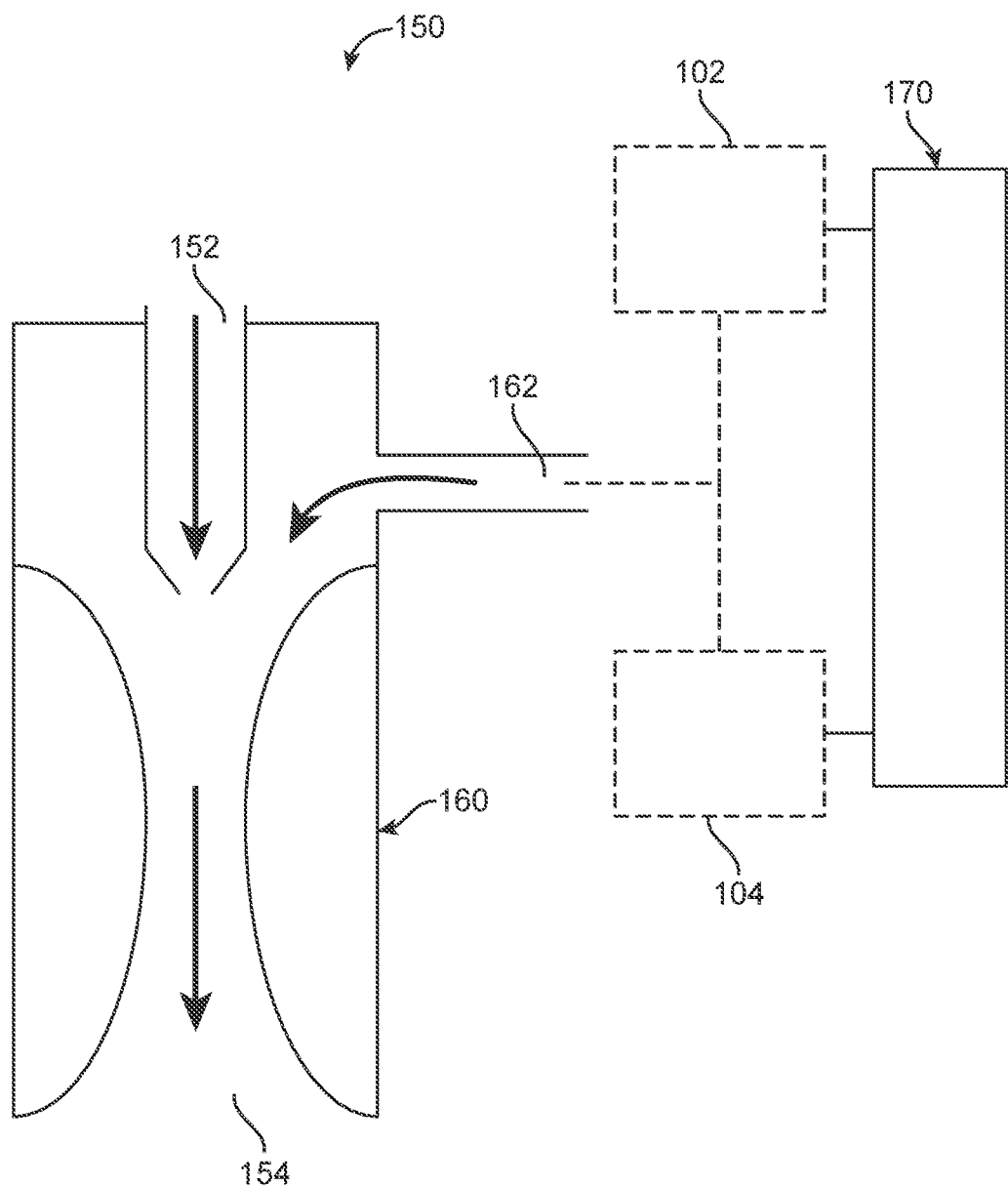
FIG. 3 is a schematic view of another illustrative embodiment of a scavenging apparatus.

In one or more embodiments, the scavenging apparatus 150 as described herein may include an ejector 160 as illustrated in FIG. 3. The ejector 160 may include a pressure port 162 between the scavenging inlet 152 and the scavenging outlet 154. The pressure port 162 may be in fluid communication with an air supply 106 (e.g., a compressed air source 104 and/or an exhaust source 102) such that fluid flow from the air supply (e.g., the compressed air source 104 and/or exhaust source 102) to the pressure port 162 may be configured to move fluid and sediment entering the scavenging inlet 152, from the egress aperture 140, through the scavenging outlet 154. For example, the fluid flow from the air supply 106 may flow into the pressure port 162 and out of the scavenging outlet 154 such that the fluid flow may pull (e.g., create a vacuum) fluid and sediment entering the scavenging inlet 152, from the egress aperture 140, through the scavenging outlet 154. Air supply 106 is shown in FIG. 2 and may include, e.g., the exhaust source 102, the compressed air source 104, or any other suitable supply of air.

The control electronics 170 may be operably connected to either or both of the compressed air source 104 and the exhaust source 102 (e.g., whether one or both are being used with the scavenging apparatus 150) to control actuation of the scavenging apparatus 150. For example, the control electronics 170 may control additional valves and switches to actuate the scavenging apparatus 150 based on timing logic (e.g., as it relates to the pulse cleaning apparatus 180) described herein. For example, the scavenging apparatus 150 may include a control valve 105 (e.g., as shown in FIG. 2) positioned between the air supply 106 and the pressure port 162, which may be configured to restrict the air from exiting the air supply 106 before desired.

Furthermore, because the compressed air source 104 may be configured to actuate the scavenging apparatus almost immediately (e.g., without any ramp-up time due to the storage of compressed air), the scavenging apparatus that is operably coupled to the compressed air source 104 may be configured to start the scavenging time period simultaneously with the cleaning operation. In other words, the effects of the compressed air source 104 driven scavenging apparatus may be utilized immediately (e.g., moving fluid and sediment entering the scavenging inlet 152 through the scavenging outlet 154) and, therefore, may start at the same time as the cleaning operation. Furthermore, the compressed air source 104, which is in fluid communication with the pressure port 162 may be the same or separate from the accumulator tank 158 described herein.

Additionally, the exhaust source 102 may be used similar to the compressed air source 104 described herein or may provide a more constant source of scavenge. For example, the exhaust source 102 may provide a more constant source of fluid flow when the vehicle is on and producing exhaust. Further, the faster the vehicle engine is operating, the more exhaust may be produced. Therefore, the pressure of the exhaust source 102 may be dependent on the state of the vehicle engine.

In one or more embodiments, regardless of the source through which the scavenging apparatus 150 operates, the scavenging apparatus 150 may transition from a first scavenging mode (e.g., a reduced flow rate) that is continuously operating to a second scavenging mode (e.g., an increased flow rate) when the scavenging apparatus 150 is started or actuated. It is noted that the "reduced" flow rate of the first scavenging mode is described relative to the "increased" flow rate of the second scavenging mode. Specifically, during the first scavenging mode, the scavenging apparatus 150 may be operating at about 5%, about 10%, about 15%, or about 20% of full capacity, and during the second scavenging mode, the scavenging apparatus 150 may be operating at about 100%, about 90%, or about 80% of full capacity. In other words, in one or more embodiments, the scavenging apparatus 150 may not be "turned off" (e.g., operating at 0% of full capacity) during the first scavenging mode (e.g., when the scavenging apparatus 150 is stopped). However, in some embodiments, the scavenging apparatus 150 may not be generating any airflow (0% of fully capacity) during the first scavenging mode (e.g., when the scavenging apparatus 150 is stopped). As such, the scavenging apparatus 150 may be in the second scavenging mode during the scavenging time period and may be in the first scavenging mode during any other time.

Figure 4:
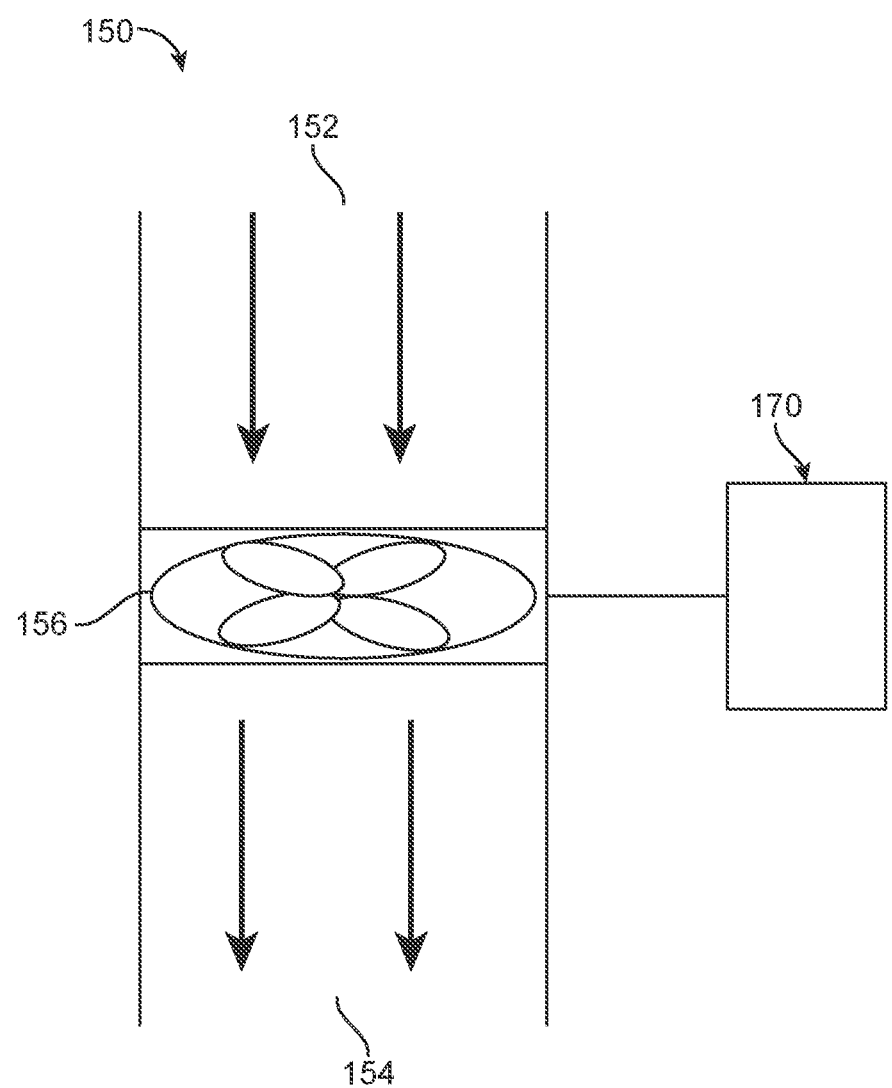
FIG. 4 is a schematic view of yet another illustrative embodiment of a scavenging apparatus.

As shown in FIG. 4, one or more alternative embodiments of the scavenging apparatus 150 described herein may include a fan 156 configured to move fluid and sediment entering the scavenging inlet 152, from the egress aperture 140, through the scavenging outlet 154. The fan 156 may be operably coupled to the control electronics 170 such that the fan 156 may be configured to operate during the scavenging time period. In some embodiments, the fan 156 may require additional time to "ramp-up" to full operating speed, therefore, the fan 156 may be actuated prior to the cleaning operation to accommodate for that additional time and ensure the fan 156 is operating at maximum speed during the cleaning operation. In other words, the scavenging apparatus 150 including a fan 156 may start (e.g., the scavenging time period) before the beginning of the cleaning operation as described herein.

Figure 5:
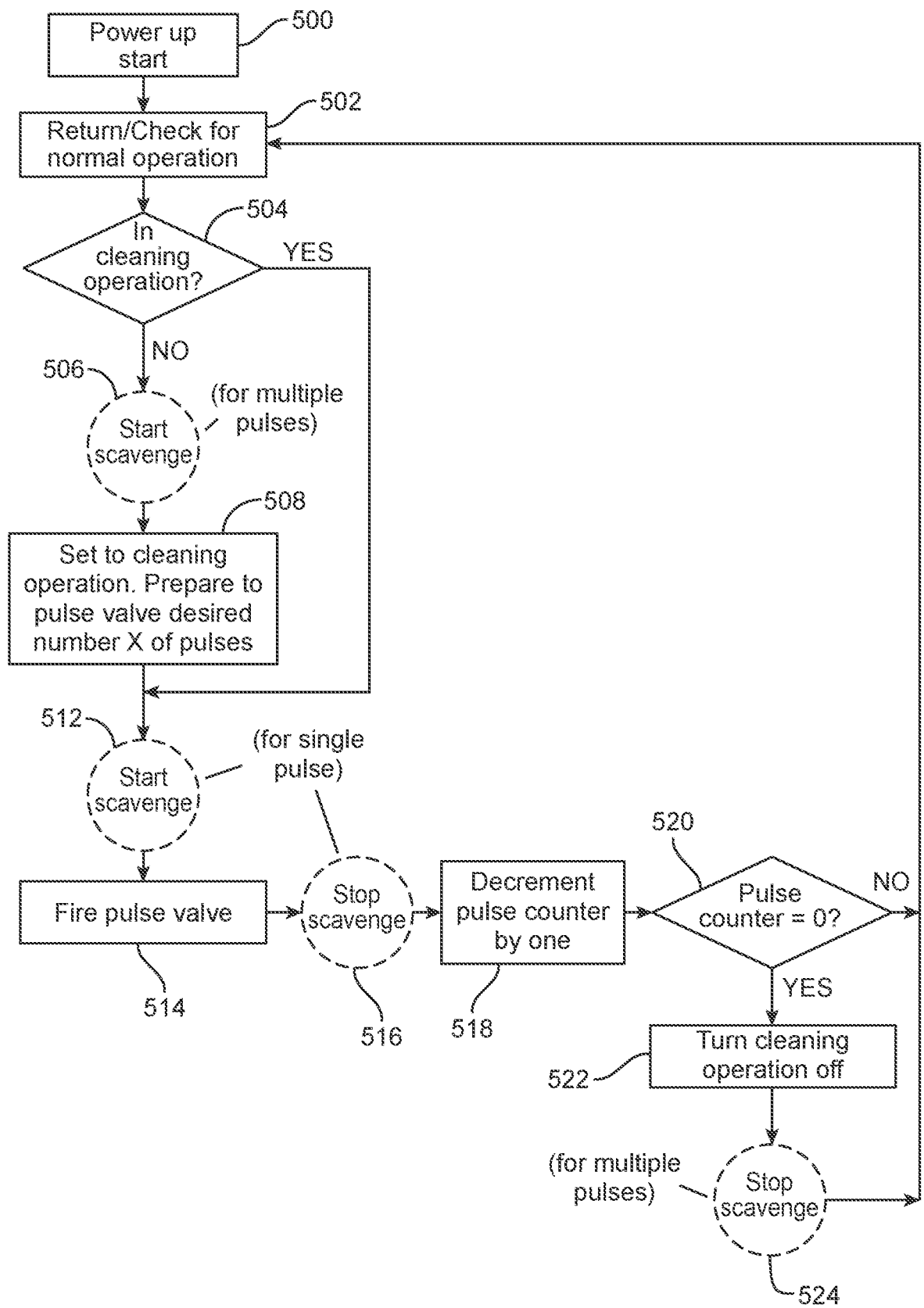
FIG. 5 is a flow chart diagram of logic systems and steps for operating the air cleaner assembly of FIG. 2 as described herein.

FIG. 5 illustrates a flow chart depicting a method of operating an air cleaner assembly in accordance with the embodiments described herein. For example, the control electronics (e.g., control logic) may power up/start the system as shown at reference numeral 500. At 502, a programming check may be used to indicate whether the system is in proper operation. Next, the control electronics (e.g., logic) may check whether the system is in the cleaning operation 504. For example, the cleaning operation inquiry 504 may determine whether the cleaning operation has already been initiated or may need to be initiated. If the cleaning operation inquiry 504 determines that the cleaning operation has not been initiated, the cleaning operation is set to on 508 and the number of pulses is set to a desired number X (e.g., 1 pulse, 2 pulses, 3 pulses, etc.), e.g., by a user, preprogrammed, etc.

If the air cleaner assembly is configured such that the pulse cleaning apparatus is set for multiple pulses over the cleaning operation and the scavenge apparatus is configured to scavenge during the entire cleaning operation (e.g., scavenge for multiple pulses), the scavenge may be started at 506, prior to or simultaneously with starting the cleaning operation 508. By starting the scavenging 506, the scavenging apparatus may be selectively actuated for the scavenging time period (e.g., beginning before or simultaneously to the start of the cleaning operation) to move fluid and sediment entering the scavenging inlet, from the egress aperture, through the scavenging outlet during the scavenging time period. In some embodiments, actuating the scavenging apparatus may include, e.g., opening a valve 105 (e.g., as shown in FIG. 2) to provide fluid communication between the pressure port 162 of the ejector 160 and an air supply 106 (e.g., as shown in FIG. 2), turning on a fan 156, etc. In some embodiments, the scavenging time period may begin after the start of the cleaning operation.

At the start of the cleaning operation 508, the pulse cleaning apparatus may fire a pulse 514. In other words, firing a pulse 514 may include selectively delivering gas into the clean air space defined by the filter media and the air cleaner housing for a pulse cleaning period (e.g., the duration of the cleaning operation) such that sediment detaches from the exterior surface of the filter media. Next, the control electronics may decrement the pulse counter by one 518 and may determine whether the pulse counter is at zero 520 (e.g., indicating that all of the set number of pulses have occurred). If the pulse counter is not equal to zero, the process may start over, may check for normal operation 502, and may prepare for another pulse 514 from the pulse cleaning apparatus (e.g., when in the multiple pulse configuration). After the pulse counter is determined to equal zero, the cleaning operation may be turned off 522 and the scavenge is stopped 524 to end the scavenging time period. In other words, once the cleaning operation is turned off 522, the control electronics may cease actuation of the scavenging apparatus at the end of the scavenging time period. The scavenging may end simultaneously with the end of the cleaning operation or sometime thereafter, as described herein. In some embodiments, the scavenging time period may end before the end of the cleaning operation. In one or more embodiments, ceasing actuation of the scavenging apparatus may include, e.g., closing the valve 105 to prevent fluid communication between the pressure port 162 of the ejector 160 and the air supply 106, turning off the fan 156, etc.

In one or more embodiments, the cleaning operation may only include a single pulse or the scavenging may actuate with each individual pulse of the pulse cleaning apparatus. For example, as shown in FIG. 5, the scavenge may start 512 immediately prior to firing the pulse 514 of the pulse cleaning apparatus and the scavenge may stop 516 immediately after firing the pulse 514. In other words, the scavenging apparatus may actuate based on the beginning of an individual pulse of the pulse cleaning apparatus and the scavenging apparatus may cease actuation based on the end of the individual pulse of the pulse cleaning apparatus. In such embodiments, the cleaning operation and pulse cleaning period may correspond directly with each individual pulse (e.g., beginning at the start of pulse and ending at end of pulse) and/or start before and/or end after.

In the preceding description, reference is made to the accompanying set of drawings that form a part hereof and in which are shown by way of illustration several specific embodiments. It is to be understood that other embodiments are contemplated and may be made without departing from (e.g., still falling within) the scope of the present disclosure. The preceding detailed description, therefore, is not to be taken in a limiting sense. All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open-ended sense, and generally mean "including, but not limited to". It will be understood that "consisting essentially of", "consisting of", and the like are subsumed in "comprising," and the like.

It is noted that terms such as "top", "bottom", 37 above, "below", etc. may be used in this disclosure. These terms should not be construed as limiting the position or orientation of a structure, but should be used as providing spatial relationship between the structures.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed:

1. An air cleaner assembly comprising:
   an air cleaner housing comprising an air flow inlet and an air flow outlet, wherein the air cleaner housing comprises an outer sidewall and an interior space within the outer sidewall;
   filter media positioned within the interior space of the air cleaner housing and configured to filter air passing from the air flow inlet to the air flow outlet, the filter media and the air cleaner housing defining a clean air space in fluid communication with the air flow outlet;
   an egress aperture in fluid communication with the interior space of the air cleaner housing;
   a selective scavenging apparatus comprising a scavenging inlet and a scavenging outlet, wherein the scavenging inlet is in fluid communication with the egress aperture, wherein the selective scavenging apparatus is configured to move fluid and sediment entering the scavenging inlet, from the egress aperture, through the scavenging outlet; and
   control electronics operably coupled to the selective scavenging apparatus and a pulse cleaning apparatus extending into the clean air space of the air cleaner housing, the control electronics configured to:
      selectively actuate the pulse cleaning apparatus to perform a cleaning operation, wherein the pulse cleaning apparatus moves fluid and sediment out of the interior space through the egress aperture during the cleaning operation; and
      selectively actuate the selective scavenging apparatus to move fluid and sediment through the scavenging outlet during a scavenging time period, wherein the scavenging time period starts based on a beginning of the cleaning operation of the air cleaner assembly and ends based on a completion of the cleaning operation of the air cleaner assembly.

2. The air cleaner assembly of claim 1, wherein the scavenging time period starts before the beginning of the cleaning operation of the air cleaner assembly.

3. The air cleaner assembly of claim 1, wherein the scavenging time period starts simultaneously with the beginning of the cleaning operation of the air cleaner assembly.

4. The air cleaner assembly of claim 1, wherein the scavenging time period ends after the completion of the cleaning operation of the air cleaner assembly.

5. The air cleaner assembly of claim 1, wherein the scavenging time period ends simultaneously with the completion of the cleaning operation of the air cleaner assembly.

6. The air cleaner assembly of claim 1, wherein the pulse cleaning apparatus is configured to direct a single pulse of gas into the clean air space of the air cleaner housing during the cleaning operation such that sediment detaches from an exterior surface of the filter media.

7. The air cleaner assembly of claim 1, wherein the pulse cleaning apparatus is configured to direct multiple pulses of gas into the clean air space of the air cleaner housing during the cleaning operation such that sediment detaches from an exterior surface of the filter media, wherein a duration of the cleaning operation is less than or equal to 60 minutes.

8. The air cleaner assembly of claim 7, wherein the multiple pulses of gas are evenly spaced apart over the duration of the cleaning operation.

9. The air cleaner assembly of claim 1, wherein the selective scavenging apparatus comprises an ejector comprising a pressure port between the scavenging inlet and the scavenging outlet, wherein the pressure port is in fluid communication with an exhaust source such that fluid flow from the exhaust source to the pressure port is configured to move fluid and sediment entering the scavenging inlet, from the egress aperture, through the scavenging outlet.

10. The air cleaner assembly of claim 1, wherein the selective scavenging apparatus comprises an ejector comprising a pressure port between the scavenging inlet and the scavenging outlet, wherein the pressure port is in fluid communication with an air compressor such that fluid flow from the air compressor to the pressure port is configured to move fluid and sediment entering the scavenging inlet, from the egress aperture, through the scavenging outlet.

11. The air cleaner assembly of claim 1, wherein the selective scavenging apparatus comprises a fan configured to move fluid and sediment entering the scavenging inlet, from the egress aperture, through the scavenging outlet.

12. A method of operating an air cleaner assembly that comprises an air cleaner housing comprising an air flow inlet, an air flow outlet, an outer sidewall defining an interior space within the outer sidewall, and filter media configured to filter air passing from the air flow inlet to the air flow outlet, an egress aperture in fluid communication with the interior space of the air cleaner housing, and selective scavenging apparatus positioned proximate the air cleaner housing, wherein the selective scavenging apparatus comprises a scavenging inlet and a scavenging outlet, wherein the scavenging inlet is in fluid communication with the egress aperture, wherein the method comprises:
  selectively delivering gas into a clean air space defined by the filter media and the air cleaner housing for a pulse cleaning period such that sediment detaches from an exterior surface of the filter media;
  selectively actuating the selective scavenging apparatus for a scavenging time period, wherein the selective scavenging apparatus moves fluid and sediment entering the scavenging inlet, from the egress aperture, through the scavenging outlet during the scavenging time period, wherein the scavenging time period starts based on the pulse cleaning period; and
  ceasing actuation of the selective scavenging apparatus at an end of the scavenging time period, wherein the scavenging time period ends based on the pulse cleaning period.

13. The method of claim 12, wherein the scavenging time period starts before a start of the pulse cleaning period.

14. The method of claim 12, wherein the scavenging time period starts simultaneously with a start of the pulse cleaning period.

15. The method of claim 12, wherein the scavenging time period ends after an end of the pulse cleaning period.

16. The method of claim 12, wherein the scavenging time period ends simultaneously with an end of the pulse cleaning period.

17. The method of claim 12, wherein selectively delivering gas into the clean air space comprises directing a single pulse of gas into the clean air space of the air cleaner housing during the pulse cleaning period such that sediment detaches from an exterior surface of the filter media.

18. The method of claim 12, wherein selectively delivering gas into the clean air space comprises directing multiple pulses of gas into the clean air space of the air cleaner housing during the pulse cleaning period such that sediment detaches from an exterior surface of the filter media, wherein a duration of the cleaning operation is less than or equal to 60 minutes.

19. The method of claim 18, wherein the multiple pulses of gas are evenly spaced apart over the duration of the pulse cleaning period.

20. The method of claim 12, wherein the selective scavenging apparatus comprises an ejector defining a pressure port between the scavenging inlet and the scavenging outlet, wherein actuating the selective scavenging apparatus comprises directing fluid flow from an exhaust source, in fluid communication with the pressure port, through the pressure port of the ejector to move fluid and sediment entering the scavenging inlet, from the egress aperture, through the scavenging outlet.

21. The method of claim 12, wherein the selective scavenging apparatus comprises an ejector defining a pressure port between the scavenging inlet and the scavenging outlet, wherein actuating the selective scavenging apparatus comprises directing fluid flow from an air compressor, in fluid communication with the pressure port, through the pressure port of the ejector to move fluid and sediment entering the scavenging inlet, from the egress aperture, through the scavenging outlet.

22. The method of claim 20, wherein actuating the selective scavenging apparatus comprises opening a valve to provide fluid communication between the pressure port of the ejector and an air supply and ceasing actuation of the selective scavenging apparatus comprises closing the valve to prevent fluid communication between the pressure port of the ejector and the air supply.

23. The method of claim 12, wherein the selective scavenging apparatus comprises a fan configured to move fluid and sediment entering the scavenging inlet, from the egress aperture, through the scavenging outlet.

24. An air cleaner assembly comprising:
  an air cleaner housing comprising an air flow inlet and an air flow outlet, wherein the air cleaner housing comprises an outer sidewall defining an interior space within the outer sidewall;
  filter media positioned within the interior space of the air cleaner housing and configured to filter air passing from the air flow inlet to the air flow outlet, the filter media and the air cleaner housing defining a clean air space in fluid communication with the air flow outlet;
  an egress aperture in fluid communication with the interior space of the air cleaner housing;
  a pulse cleaning apparatus extending into the clean air space in the air cleaner housing;
  a selective scavenging apparatus comprising a scavenging inlet and a scavenging outlet, wherein the scavenging inlet is in fluid communication with the egress aperture, wherein the selective scavenging apparatus is configured to move fluid and sediment entering the scavenging inlet, from the egress aperture, through the scavenging outlet; and
  control electronics operably coupled to the selective scavenging apparatus and the pulse cleaning apparatus, wherein the control electronics are configured to:
    selectively actuate the selective scavenging apparatus for a scavenging time period, wherein the selective scavenging apparatus moves fluid and sediment entering the scavenging inlet, from the egress aperture, through the scavenging outlet during the scavenging time period, and
  selectively direct a pulse of gas into the clean air space for a pulse cleaning period using the pulse cleaning apparatus such that sediment detaches from an exterior surface of the filter media, wherein a duration of the scavenging time period is greater than or equal to the pulse cleaning period.

* * * * *